(12) United States Patent
Darbishire

(10) Patent No.: US 6,328,364 B1
(45) Date of Patent: Dec. 11, 2001

(54) PULL OUT DRAWER SYSTEM FOR VEHICLES AND TRAILERS

(75) Inventor: R. Alan Darbishire, St. Thomas (CA)

(73) Assignee: Durakon Acquisition Corp., Lapeer, MI (US)

(*) Notice: Subject to any disclaimer, the term of this patent is extended or adjusted under 35 U.S.C. 154(b) by 0 days.

(21) Appl. No.: 09/506,057

(22) Filed: Feb. 17, 2000

Related U.S. Application Data

(63) Continuation-in-part of application No. 09/393,436, filed on Sep. 10, 1999, which is a continuation-in-part of application No. 29/116,243, filed on Dec. 27, 1999, and application No. 29/116,244, filed on Dec. 27, 1999, and application No. 29/116,245, filed on Dec. 27, 1999.
(60) Provisional application No. 60/099,922, filed on Sep. 11, 1998.

(51) Int. Cl.$^7$ ..................................................... B60R 11/06
(52) U.S. Cl. ......................................... 296/26.09; 296/39.2
(58) Field of Search .............................. 296/26.09, 26.08, 296/26.1, 37.6, 39.1, 39.2; 414/522

(56) References Cited

U.S. PATENT DOCUMENTS

| | | | |
|---|---|---|---|
| Re. 32,198 | 7/1986 | Wayne | 296/39 R |
| D. 271,009 | 10/1983 | Fischler | D12/98 |
| D. 298,112 | 10/1988 | Hall | D12/98 |
| D. 333,112 | 2/1993 | Diaco et al. | D12/98 |
| D. 371,535 | 7/1996 | Young | D12/221 |

(List continued on next page.)

FOREIGN PATENT DOCUMENTS

| | | | |
|---|---|---|---|
| 1330572 | 7/1995 | (CA) | 296/39.2 |

OTHER PUBLICATIONS

Deck Express, Inc., "New Innovations for Pickup Trucks and Vans—BED MATE, The Practical, Extedible Deck," ca. Nov. 1995.
Deck Express, Inc., "Does This Look Familiar?", Brochure w/sketch of Locking Mechanism. Brochure Publ. Ca. 1995–1996.
Beaver Bed Systems, Inc., "Retractable Truck Beds," Global Communications Network, 1998.

(List continued on next page.)

Primary Examiner—Joseph D. Pape
(74) Attorney, Agent, or Firm—Christopher John Rudy; David D. Murray

(57) ABSTRACT

A pull out drawer system for vehicles and trailers includes a stationary mounting frame having a set of rails parallel with one another, which has a first set of rollers mounted thereon, the rails adapted for receiving a second set of rollers; a movable frame having the second set of rollers mounted thereon; and a load-bearing surface mounted to the movable frame—the movable frame and load-bearing surface subcombination mounted to the stationary mounting frame with rolling contact both between the first set of rollers and the movable frame and load-bearing surface subcombination and between the set of rails and the second set of rollers. The system or another pull out drawer system may be ramped so as to be higher on the pull out end than on the opposing end. An over the wheel well pull out tray for a pickup truck includes a generally planarly laid out bottom member; at least one upraised side wall extending from the bottom member; and, extending outwardly from said at least one side wall, a wing member. The over the wheel well pull out tray may be mounted with a pull out drawer system. The load bearing surface, which may be a tray, can include a generally planarly laid out bottom member having a plurality of major areas, at least one of which has a series of ribs with a longitudinal and a latitudinal component. The pull out drawer system can be mounted in combination with a vehicle or trailer, with the system mounted to a suitable surface of the vehicle or trailer.

32 Claims, 9 Drawing Sheets

U.S. PATENT DOCUMENTS

| | | |
|---|---|---|
| D. 383,112 | 9/1997 | Patterson . |
| D. 414,741 | 10/1999 | Bergh . |
| 2,014,019 * | 9/1935 | Girl . |
| 2,091,071 * | 8/1937 | Girl . |
| 2,549,018 | 4/1951 | Sarlo ................................. 296/26.09 |
| 2,791,463 | 5/1957 | Levitt ..................................... 296/181 |
| 2,792,137 * | 5/1957 | Soloman et al. .............. 296/26.09 X |
| 2,852,303 | 9/1958 | Hopson ................................... 296/26 |
| 3,004,790 | 10/1961 | Mayer ................................ 296/26.09 |
| 4,047,749 | 9/1977 | Lambitz et al. .................... 296/39 R |
| 4,188,058 | 2/1980 | Resa et al. ............................ 296/208 |
| 4,305,695 | 12/1981 | Zachrich .............................. 414/522 |
| 4,333,678 * | 6/1982 | Munoz et al. ....................... 296/39.2 |
| 4,428,306 | 1/1984 | Dresen et al. ....................... 108/53.3 |
| 4,573,731 | 3/1986 | Knaack et al. ....................... 296/37.6 |
| 4,592,583 | 6/1986 | Dresen et al. ...................... 296/39 R |
| 4,629,390 | 12/1986 | Burke ................................... 414/527 |
| 4,681,360 | 7/1987 | Peters et al. ......................... 296/37.6 |
| 4,685,857 | 8/1987 | Goeser et al. ....................... 414/522 |
| 4,693,507 | 9/1987 | Dresen et al. ...................... 296/39 R |
| 4,750,776 | 6/1988 | Barben .............................. 296/39 R |
| 4,767,149 | 8/1988 | Rye ..................................... 296/39 R |
| 4,768,822 | 9/1988 | Gower ................................ 296/39 R |
| 4,824,158 | 4/1989 | Peters et al. ......................... 296/37.6 |
| 4,838,745 | 6/1989 | Haydock . |
| 4,887,158 | 12/1989 | Bott ...................................... 410/144 |
| 4,909,558 | 3/1990 | Roshinsky ........................... 296/37.6 |
| 4,958,876 | 9/1990 | Diaco et al. ......................... 296/39.2 |
| 4,990,049 | 2/1991 | Hargrove ............................. 414/537 |
| 4,991,899 | 2/1991 | Scott .................................. 296/39.2 |
| 4,993,088 | 2/1991 | Chudik ..................................... 5/128 |
| 5,046,913 | 9/1991 | Domek et al. ....................... 414/522 |
| 5,052,878 | 10/1991 | Brockhaus ........................... 414/522 |
| 5,064,335 | 11/1991 | Bergeron et al. .................... 414/522 |
| 5,090,335 | 2/1992 | Russell ................................. 108/44 |
| 5,098,146 | 3/1992 | Albrecht et al. ....................... 296/26 |
| 5,136,953 | 8/1992 | Schmidt ................................ 108/44 |
| 5,167,434 | 12/1992 | Bott .................................... 296/39.2 |
| 5,234,116 | 8/1993 | Kristinsson et al. . |
| 5,239,934 | 8/1993 | Miller et al. ........................... 108/44 |
| 5,379,906 | 1/1995 | Levin et al. . |
| 5,392,972 | 2/1995 | Caruso et al. . |
| 5,429,403 | 7/1995 | Brasher ................................. 296/32 |
| 5,456,511 | 10/1995 | Webber ............................. 296/26.09 |
| 5,469,999 | 11/1995 | Phirippidis . |
| 5,484,091 | 1/1996 | Malinoswki et al. . |
| 5,505,358 | 4/1996 | Haase . |
| 5,513,941 | 5/1996 | Kulas et al. ......................... 414/522 |
| 5,526,972 | 6/1996 | Frazier et al. . |
| 5,564,767 | 10/1996 | Strepek ................................. 296/26 |
| 5,568,890 | 10/1996 | Magee et al. . |
| 5,584,524 | 12/1996 | Vogel .................................. 296/39.1 |
| 5,634,408 | 6/1997 | Jarkowski ............................. 108/44 |
| 5,683,132 * | 11/1997 | Danzo et al. ....................... 296/37.6 |
| 5,819,996 | 10/1998 | Koons, Jr. . |
| 5,934,725 | 8/1999 | Bowers ............................. 296/26.09 |
| 5,979,725 | 11/1999 | Lehrman . |

OTHER PUBLICATIONS

Beaver Bed Systems, Inc., "Retractable Truck Beds," Global Communications Network, 1999.

Weather Guard, "Truck and Van Storage Equipment—Bed Rat® Sliding Platforms," Global Communications Network, 1999.

Extendo Bed Co., "The Lastest in Cargo Handling Equipment," Global Communications Network, 1998.

Darbishire, U.S. provisional patent application 60/099922, filed Sep. 11,1998 (specification).

Darbishire, U.S. utility patent application 09/393436 filed Sep. 10, 1999 (specification).

Darbishire, U.S. design patent application 29/116243 filed Dec. 27, 1999 (specification).

Darbishire, U.S. design patent application 29/116244 filed Dec. 27, 1999 (specification).

Darbishire, U.S. design patent application 29/116245 filed Dec. 27, 1999 (specification).

* cited by examiner

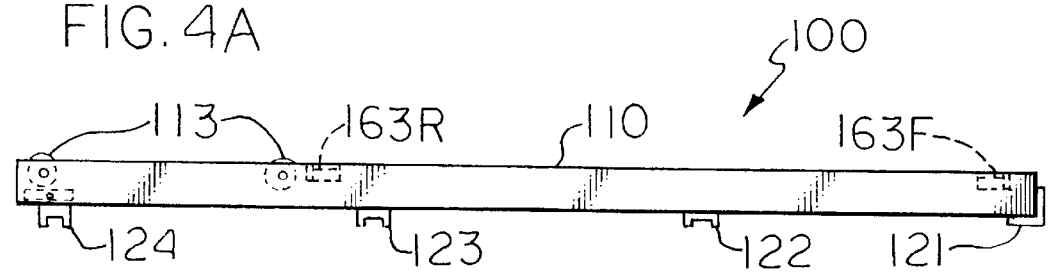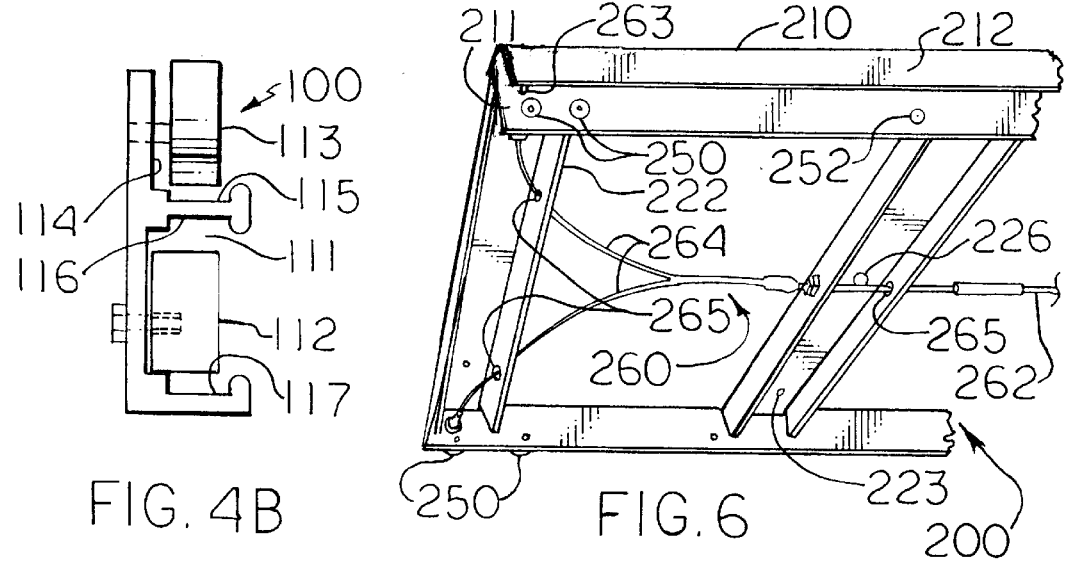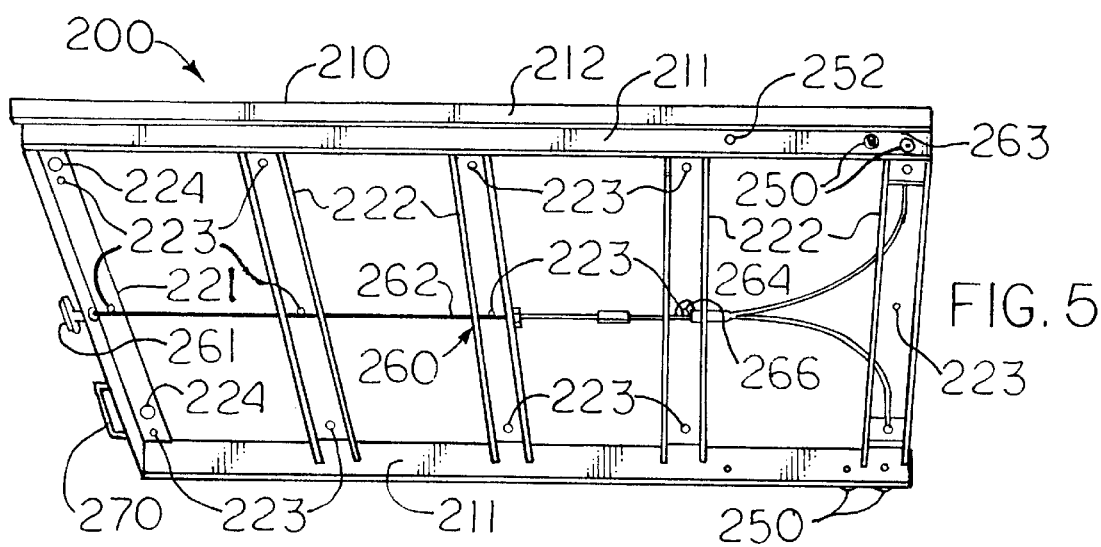

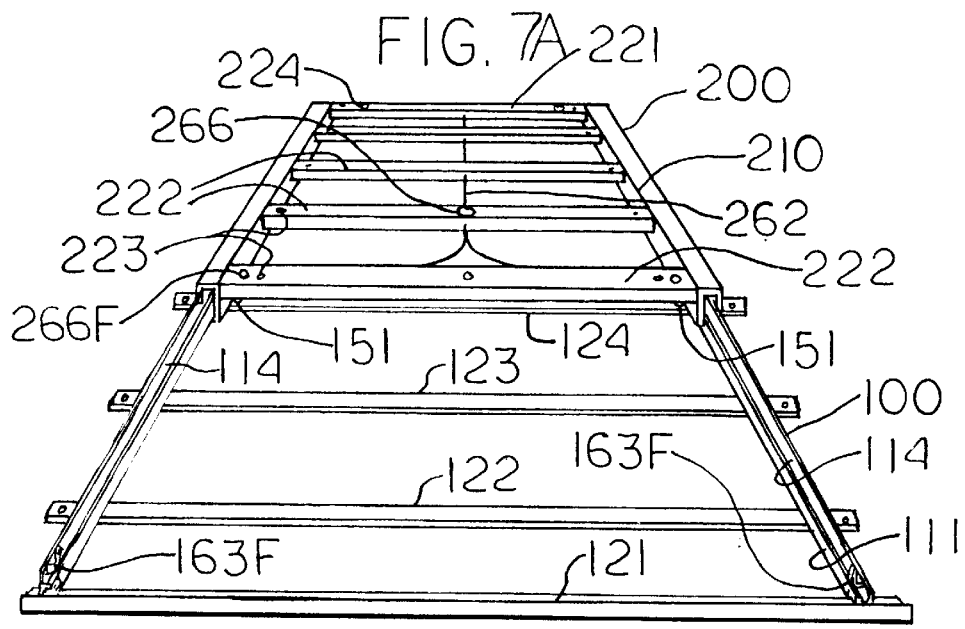
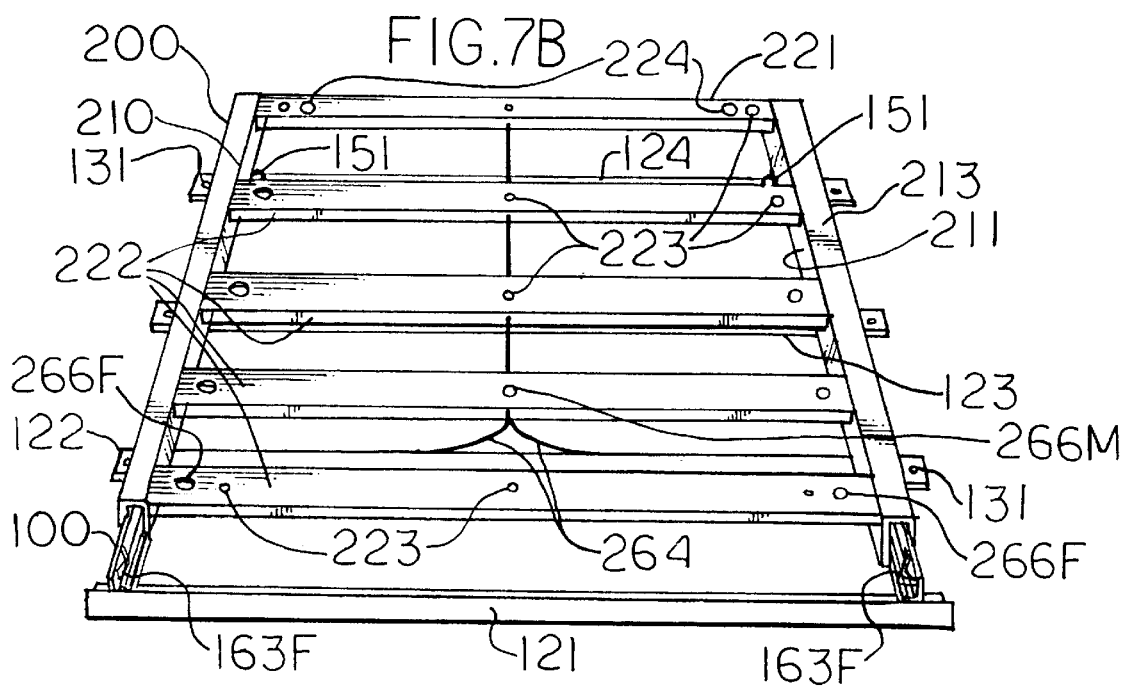

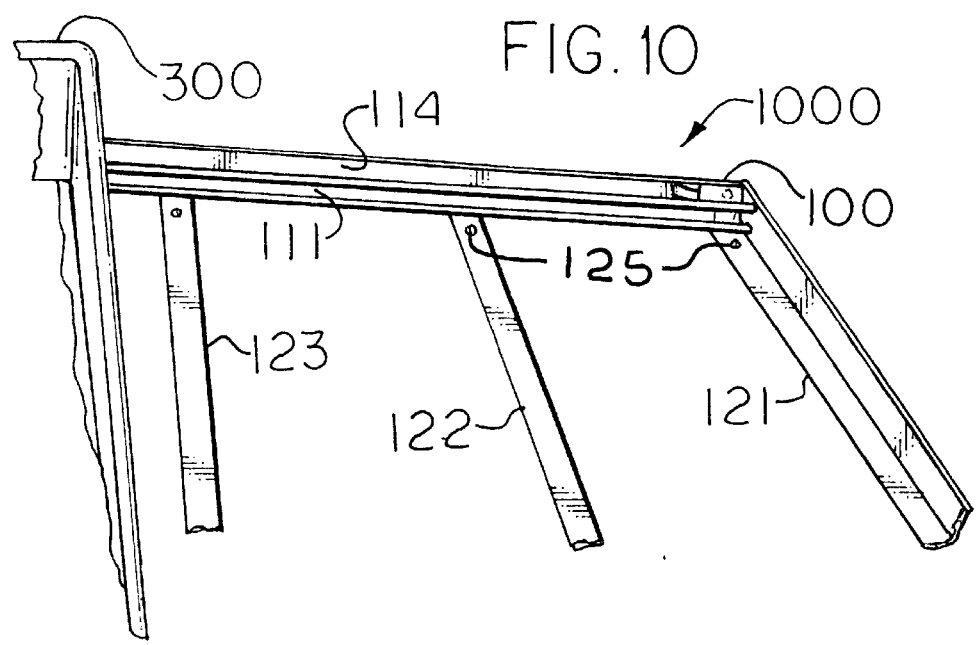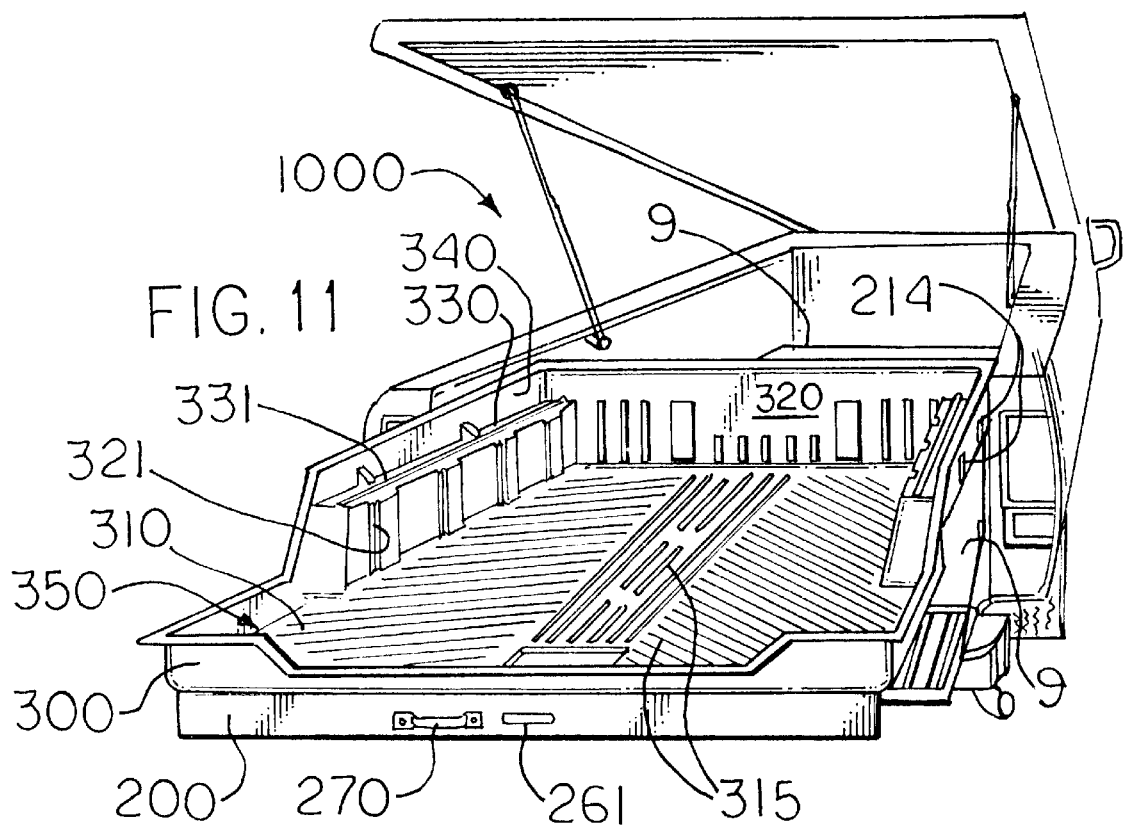

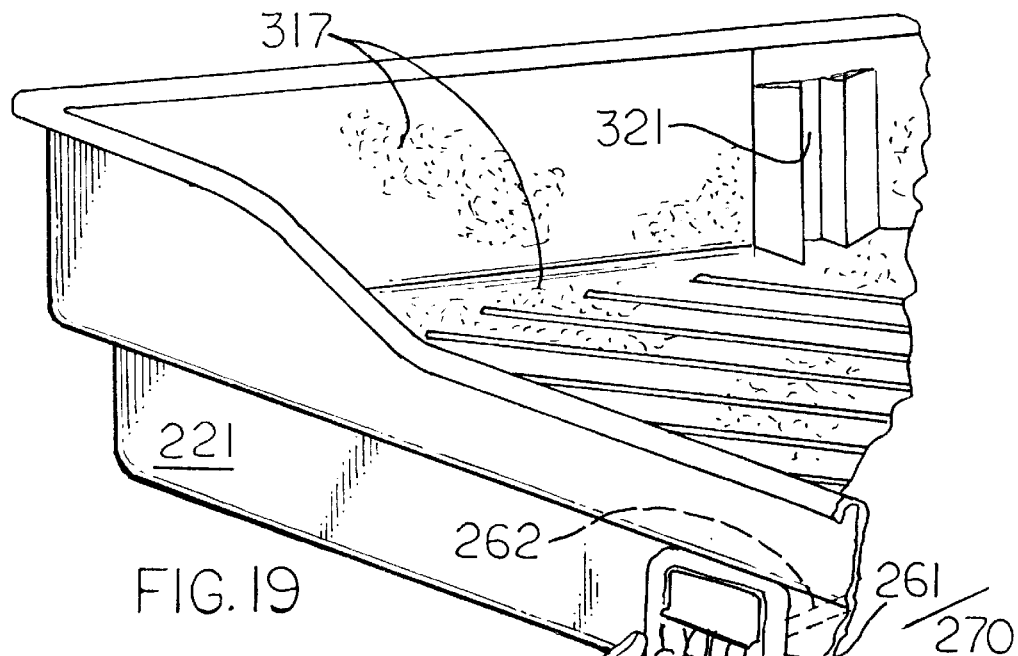
FIG.19
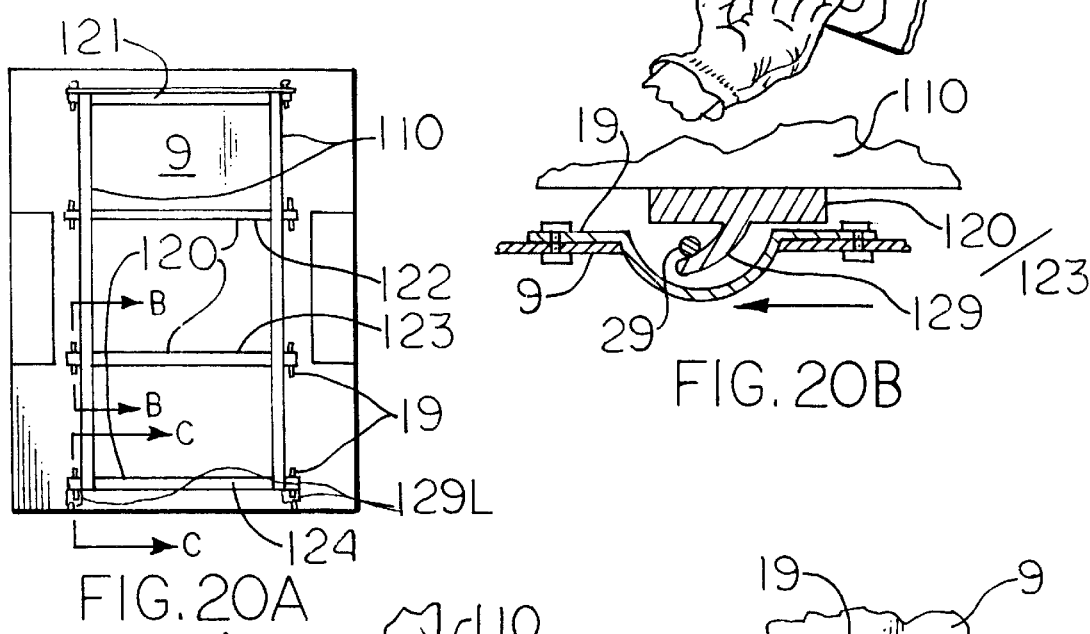
FIG.20A
FIG.20B
FIG.20C
FIG.20D

PULL OUT DRAWER SYSTEM FOR VEHICLES AND TRAILERS

CROSS-REFERENCE CLAIMS

This claims benefits under 35 USC 119(e) of U.S. provisional patent application No. 60/099,922 filed on Sep. 11, 1998; and under 35 USC 120 as a continuation in part of U.S. patent application Ser. No. 09/393,436 filed on Sep. 10, 1999 which is a continuation in part of Ser. Nos. 29/116,243, 29/116,244 and 29/116,245, the latter three filed on Dec. 27, 1999. The complete specifications of these five patent applications are incorporated herein by reference. The '922 and '436 applications are now abandoned.

FIELD

The present invention concerns a pull out drawer system for vehicles and trailers, useful for carrying cargo and dunnage, components therefor, and vehicles or trailers modified therewith.

BACKGROUND

Various cargo and dunnage carrying devices are available for assisting the pickup truck or van owner in carrying cargo and so forth. Among these are a number with sliding or rolling members. See, e.g., Bowers, U.S. Pat. No. 5,934,725; Roshinsky, U.S. Pat. No. 4,909,558.

It would be desirable to ameliorate or overcome any drawbacks associated with known cargo and dunnage carrying devices. Also, it would be desirable to provide a system which is efficient, and pleasing to the consumer, be he a commercial or a home user.

GENERAL SUMMARY

The present invention provides, in one aspect, a pull out drawer system for vehicles and trailers comprising a stationary mounting frame having a set of rails parallel with one another, which has a first set of rollers mounted thereon, said set of rails adapted for receiving a second set of rollers; a movable frame having the second set of rollers mounted thereon; and a load-bearing surface mounted to the movable frame—the movable frame and load-bearing surface subcombination mounted to the stationary mounting frame with rolling contact both between the first set of rollers and the movable frame and load-bearing surface subcombination and between the set of rails and the second set of rollers. In another aspect, it provides a pull out drawer system having pull out and opposing ends, comprising a stationary frame; a movable frame in cooperation therewith; and a load bearing surface mounted to the movable frame—wherein the assembly is ramped so as to be higher on the pull out end than on the opposing end. In another aspect, it provides an over the wheel well pull out tray for a pickup truck, comprising a generally planarly laid out bottom member; at least one upraised side wall extending from the bottom member; and, extending outwardly from said at least one side wall, a wing member—and further, it provides a pull out drawer system assembly comprising a stationary frame; a movable frame in cooperation with the stationary frame; and the over the wheel well pull out tray mounted to the movable frame. The load bearing surface and/or tray can have a generally planarly laid out bottom member with a plurality of major areas, at least on of which has a series of ribs with a longitudinal and a latitudinal component. The invention can have other beneficial features as well. The pull out drawer system can be mounted to a suitable surface of a vehicle or trailer.

The invention is useful in carrying cargo and dunnage.

Hereby, drawbacks associated with other cargo and dunnage carrying devices are ameliorated or overcome. The present system is easily extendible and lockable, whether loaded or not; sturdy; durable; ergonomically laid out; and pleasing to the operator or owner, be he a commercial or a home user. It can use available space in a vehicle cargo bed in a highly efficient manner.

Numerous further advantages attend the invention.

DRAWINGS

The appended drawings form part of the specification hereof. With respect to the drawings, which are not necessarily drawn to scale, the following is briefly noted:

FIG. 4A is right side view of a frame generally depicted in FIGS. 2 & 3, however, depicted without certain auxiliary features shown in FIG. 2, and which is employed in the system of FIG. 1.

FIG. 4B is a rear, detailed view of a left rail assembly as seen within FIGS. 2 & 3 (and otherwise present in FIG. 4A).

FIG. 5 is a right, bottom perspective view of a movable frame employed in the system of FIG. 1.

FIG. 6 is a left, bottom perspective, detailed view, slightly from the front, of an opposing end (say, the front or cab end) of the frame of FIG. 5.

FIG. 7A is a top, front perspective view of an assembled subcombination of the stationary and movable frames of FIGS. 3–6, shown in a fully extended position.

FIG. 7B is a top, front perspective view of the assembly of FIG. 7A, shown in a nearly closed position.

FIG. 10 is a top, detailed perspective view from the right hand side of a left front portion of the tray of FIG. 9, mounted (with the remaining part of the tray that is not illustrated) to a movable mounting frame (not illustrated) which is mounted in rolling cooperation with a stationary frame such as of FIGS. 3 & 4, with only a portion of the stationary frame being illustrated.

FIG. 11 is a right, rear, top perspective view of the tray of FIG. 9 assembled into an assembly as depicted in part by FIG. 10, the assembly mounted to the bed of a pickup truck.

FIG. 19 is a top, detailed perspective view from the right hand side of a left rear portion of another embodiment of the invention, showing certain modifications to the same.

FIG. 20A is a top plan view of another embodiment of the invention, showing a modified frame to bed attachment system.

FIG. 20B is a sectional view of part of the system depicted in FIG. 20A, taken along B—B.

FIG. 20C is a sectional view of part of the system depicted in FIG. 20A, taken along C—C.

FIG. 20D is a top plan view in detail of a frame attachment receptacle mounted to the bed as generally depicted in FIG. 20A.

ILLUSTRATIVE DETAIL

Figure 1:
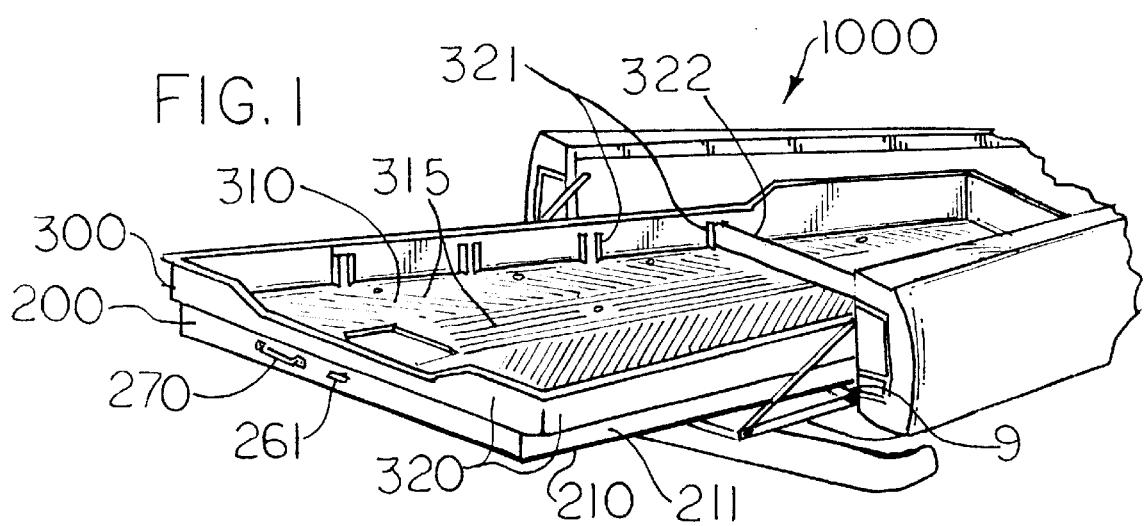
FIG. 1 is is a rear, right perspective view of an embodiment of a pull out drawer system of the present invention, installed in the bed of a pickup truck, and shown in a partially extended position.
Figure 2:
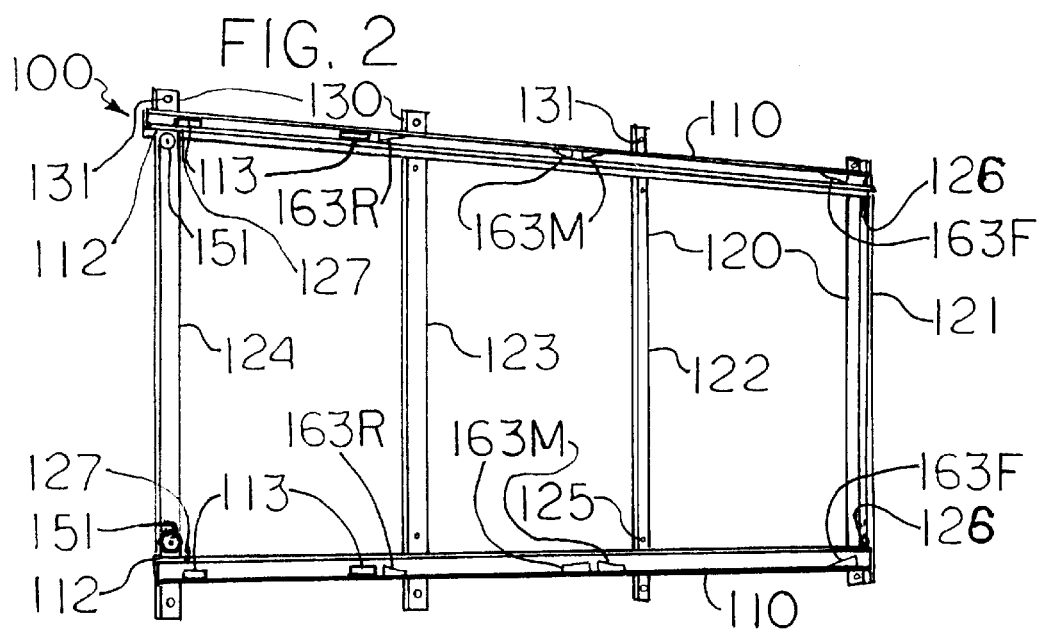
FIG. 2 is top view of a stationary mounting frame as can be employed in a system as of FIG. 1, having auxiliary features.
Figure 3:
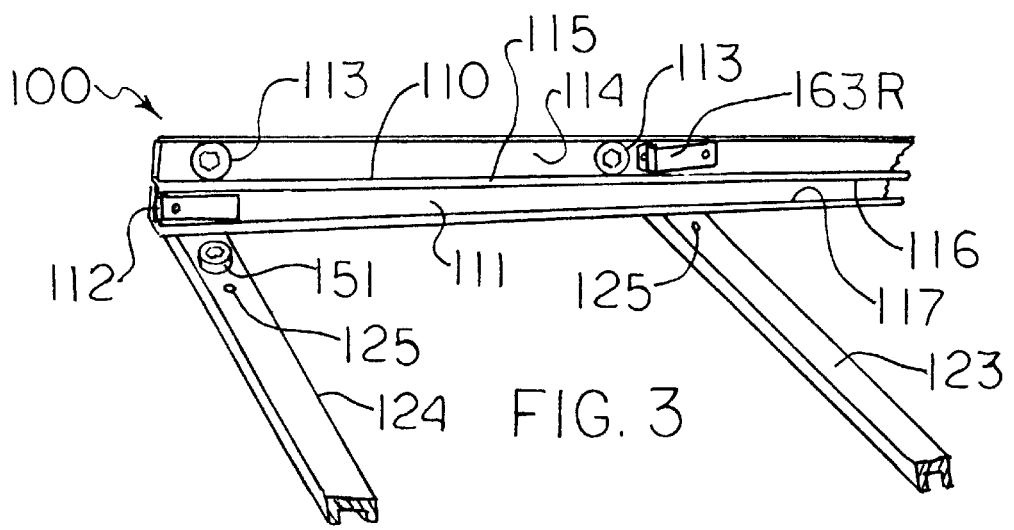
FIG. 3 is a right, rear perspective, detailed view of the left rear part of a pull out end (say, the rear or tailgate end) of the frame of FIGS. 2 & 4.

The invention can be further understood by the present detail which may be read in view of the drawings. The same is to be taken in an illustrative and not necessarily limiting sense.

In general, with reference to the drawings, suitable flat surface 9, which as an alternative may be provided with at least one frame attachment receptacle 19 having frame engaging member 29, may have attached to it cargo management system 1000. The drawings depict several embodiments of cargo management systems 1000 of the invention and component parts therefor. These can include stationary mounting frame 100; movable mounting frame 200; and load-bearing surface 300. Various specific measurements and materials may be mentioned; however, variations in the same can be effected by those skilled in the art in the practice of the invention. As examples of this, frame members and parts thereof may be made to be, say, about five feet by ten feet; about four feet by four, five, six, seven or eight feet; about three feet by four, five, six or seven feet; about two feet by three or four feet, or intermediate or larger or smaller sizes: for example, systems of the invention may be about twenty-one inches by thirty-two inches, say, for provision in a semi-truck trailer cab; about fifty inches by four feet, say for a short box pickup truck; about thirty-nine inches by six feet, say, for a compact size pickup truck model; or about fifty-eight inches by eight feet, say, for a full size, long bed pickup truck model. The frame members and parts may be of various suitable thicknesses and numbers and styles of beams and cross members. Accordingly, the system of the invention can include an inverted F-channel (having a lower channel component modified and differing from a standard C-channel) as an immovable rail, preferably, two each facing inwardly, with the same spaced apart and connected by cross members such as attached to the longitudinally extending rails not only in an H-shaped style, as depicted, but also in X-shaped or Z-shaped styles, or cross members may be absent, for instance, if the rails are mounted directly to the cargo bed of a vehicle or to another suitable surface, and so forth and the like; such immovable rails can be positioned, for example, as follows (dimensions in inches (")):

| Vehicle type | Distance between rails | Length of the rails |
|---|---|---|
| Full size long bed pickup truck | 40" | 90⅞" |
| Full size short bed pickup truck | 40" | 71¼" |
| Mid size short bed pickup truck | 35" | 71¼" |
| Compact short bed pickup truck | 31⅛" | 66³⁄₁₆". |

The system of the invention, particularly in conjunction with the inverted F-channels, can further include an inverted J-channel (which may also be termed an L-shaped member) as a movable member to interact with the inverted F-channel rails, which J-channel as well can be spaced apart by H-, X- or Z-shaped cross-members. Such stationary and movable frame foundations can be made of any suitable material, to include a metal such as aluminum, brass, steel, or a suitable plastic such as an engineering plastic, or wood, and so forth and the like. The load bearing surface, which may be in a form as simple as a flat web, is preferably in the form of a tray or drawer box having a bottom and a set of walls; such embodiments can be made of glass fiber reinforced resins; glass fiber reinforced resins covering a wood to include particle board cargo supporting surfaces; plastics including polyolefins to include polyethylene, polypropylene and so forth, polyaromatic resins to include polystyrene and so forth; polyamides and polyimides; artificial and natural rubbers to include ABS plastic compositions; nylons; polycarbonates; polyurethanes; polyvinyls, and so forth and the like; wood, metal or plastic sheet or mesh materials, and so forth and the like. Rollers may be wheels, ball and/or needle bearings, skids, air pressure provided between skids, and so forth and the like. Any suitable way to make component parts or attach them may be employed, to include by casting, forging, cold or warm working, molding, extruding, machining, shaping, welding, screwing, riveting, stapling, gluing, heat-melding, and so forth and the like. In general, the system of the invention, to include the depicted system 1000, is readily attachable to a suitable surface of a vehicle or trailer such as the bed of a pickup truck, floor of a van or even a trailer, the roof of a van, or even stacked within a shelf arrangement, say, inside a panel van, delivery truck, or trailer, or even in the sleeper compartment of a semi-tractor cab which can pull large loads, and so forth, in particular, through its mounting frame 100. Standard methods of mounting the system to the desired surface may be employed such as by use of fasteners such as rivets, bolts and nuts, metal screws, and so forth, to include a hooking arrangement, or other means such as gluing, welding, even press fitting, hook and loop mating, and so forth. Advantageously, there are two frame members, stationary frame 100 and movable frame 200, each made for the most part from aluminum, for example, extruded aluminum main structural components 110, 120, 210, 220 which are welded to form the stationary base mounting frame 100 and movable mounting frame 200; and there is mounted to the movable frame the load-bearing surface 300, which may be a tray or box unit such as molded from a suitable polyolefin such as polyethylene, or other suitable material such as an ABS plastic, or mixture thereof, which may be colored or, say, be made black, and/or otherwise treated so as to improve its visual appeal and/or improve resistance to degradation such as by ultraviolet light and so forth. Beneficially, the tray 300 is polyethylene, and is vacuum molded from one sheet, although other methods of manufacture may be employed such as by injection molding and so forth. Accordingly, the preferred system 1000 is exceedingly strong, lightweight, durable and resistant to the elements and many industrial substances, aesthetically pleasing, relatively inexpensive to manufacture, and, in addition, it can be fairly easily repairable or replaceable as by substitution of units 100, 200 or 300 or suitable component(s) thereof, for example, bearing and locking mechanism components.

Figure 8:
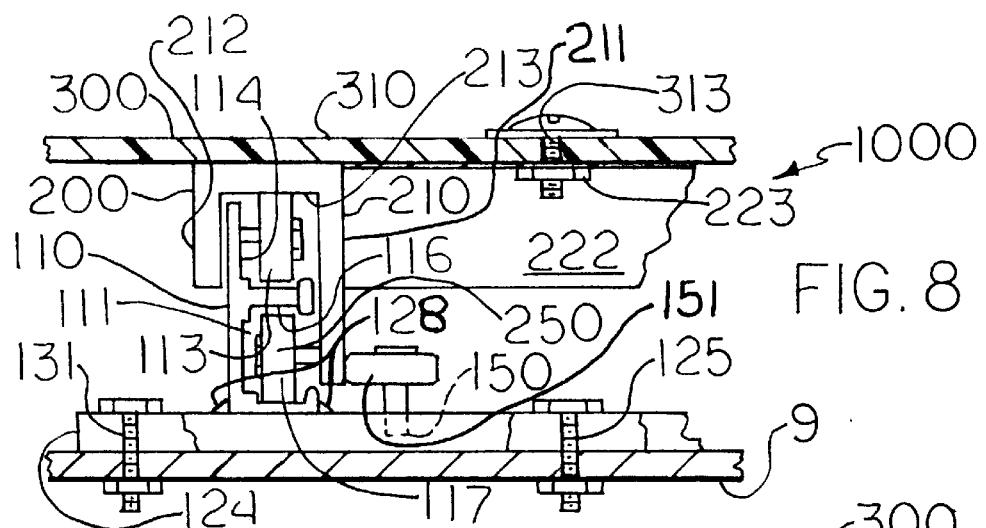
FIG. 8 is a rear view, in partial section, in detail, of a left side of a pull out drawer system of the invention such as the assembly of FIG. 7, the assembly mounted to a suitable surface of a vehicle or trailer, but having its rear roller stopping block removed from the stationary frame member channel.
Figure 9:
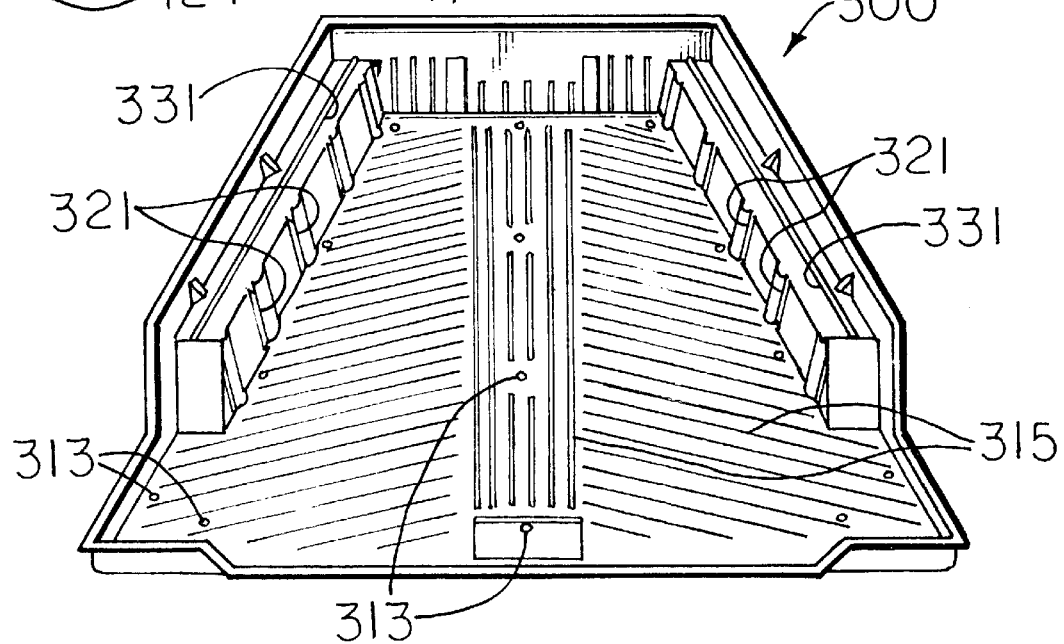
FIG. 9 is rear, perspective view of an over the wheel well tray of the invention.
Figure 12:
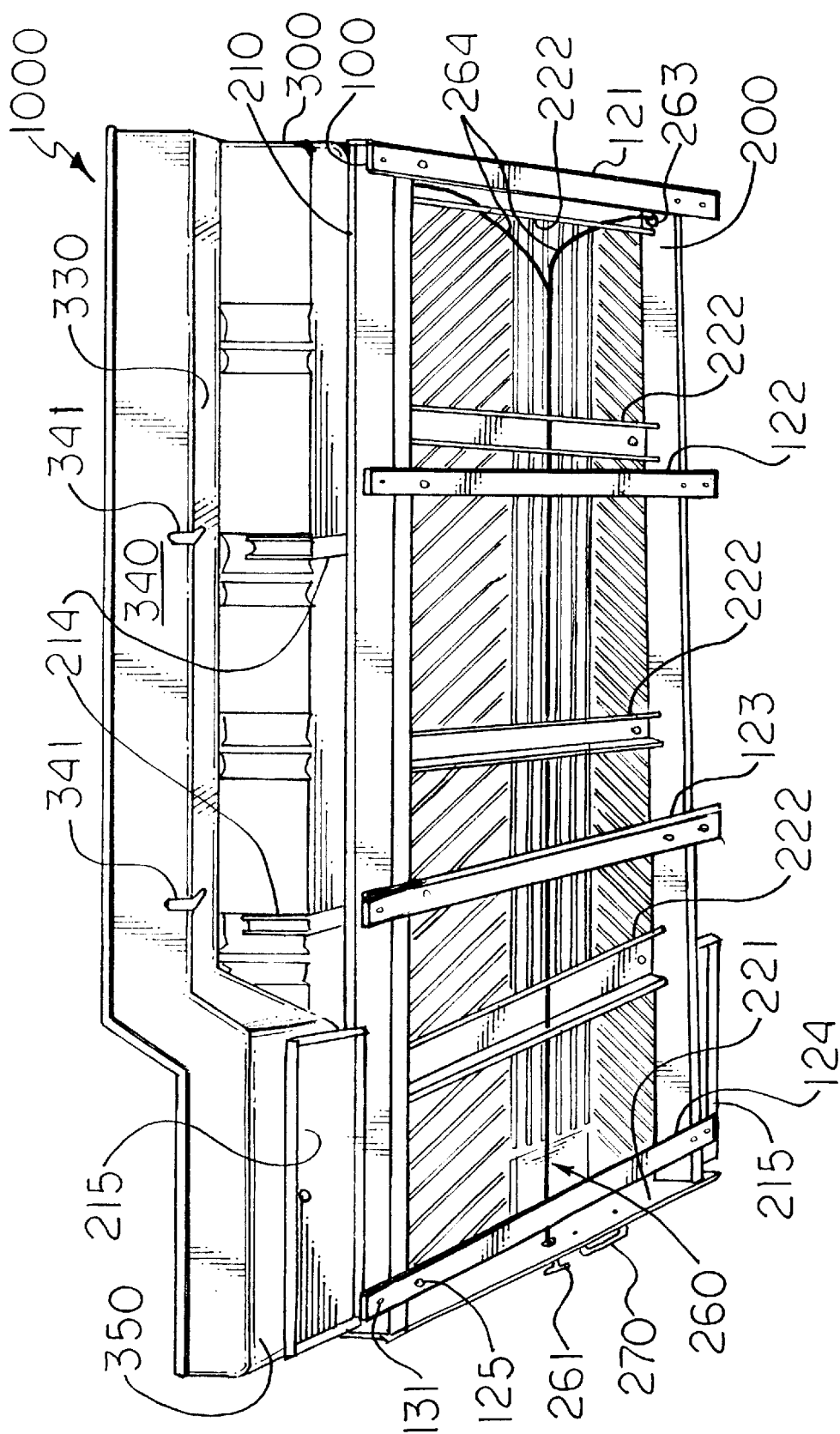
FIG. 12 is a right, bottom perspective view of the tray and frame assembly of FIG. 10, showing stationary and movable frames.
Figure 13:
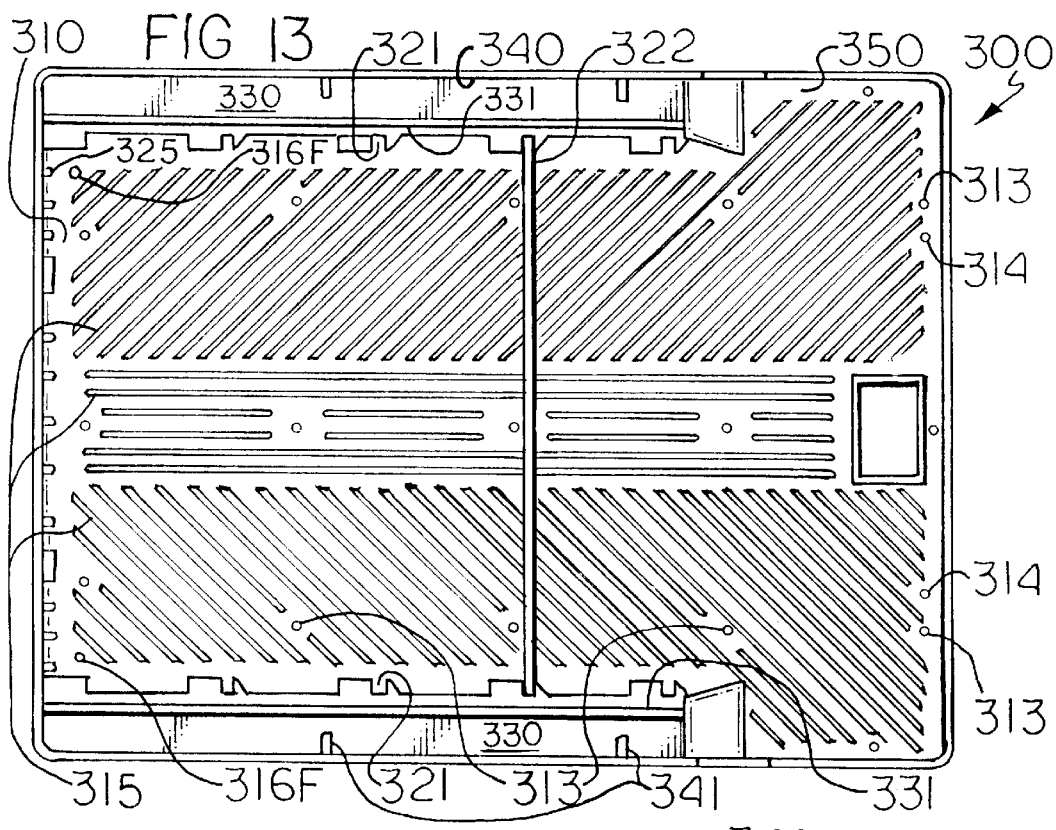
FIG. 13 is a top view of the tray of FIG. 9, also showing a removable vertical divider in place.
Figure 14:
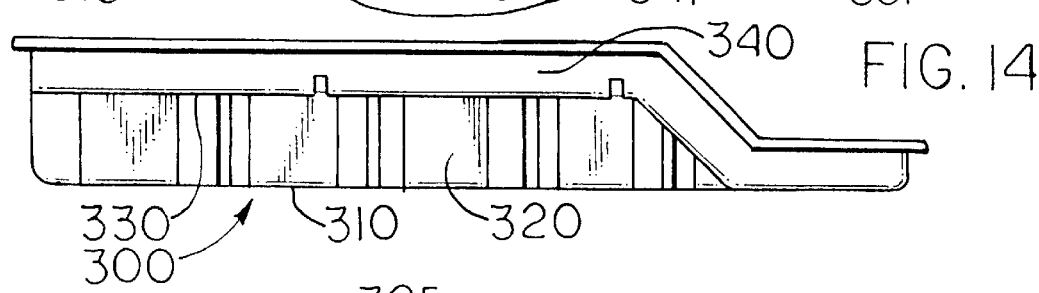
FIG. 14 is a left side view of the tray of FIG. 9.
Figure 15:
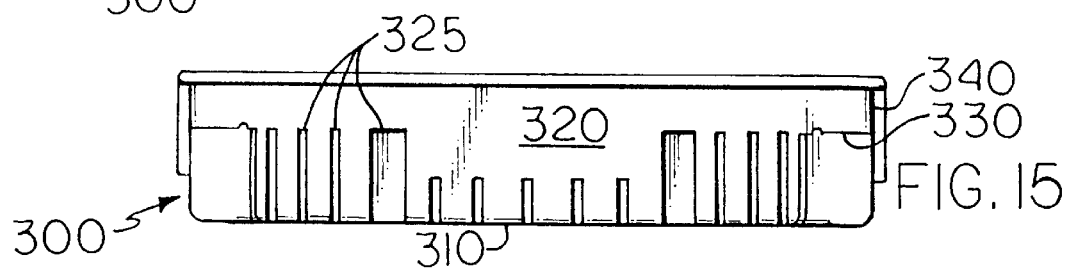
FIG. 15 is a front view of the tray of FIG. 9.
Figure 16:
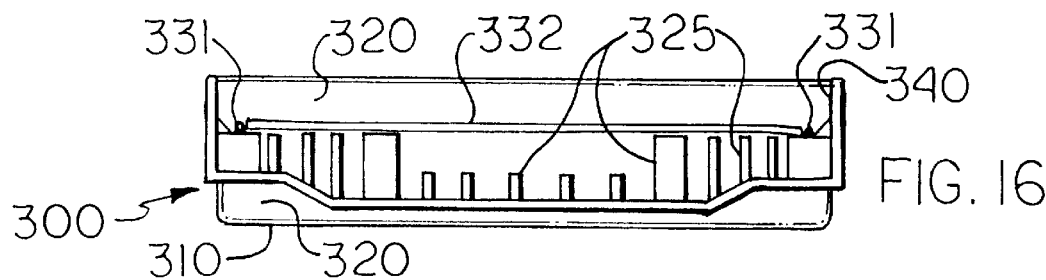
FIG. 16 is a rear view of the tray of FIG. 9, also showing a removable horizontal shelf divider in place.
Figure 17:
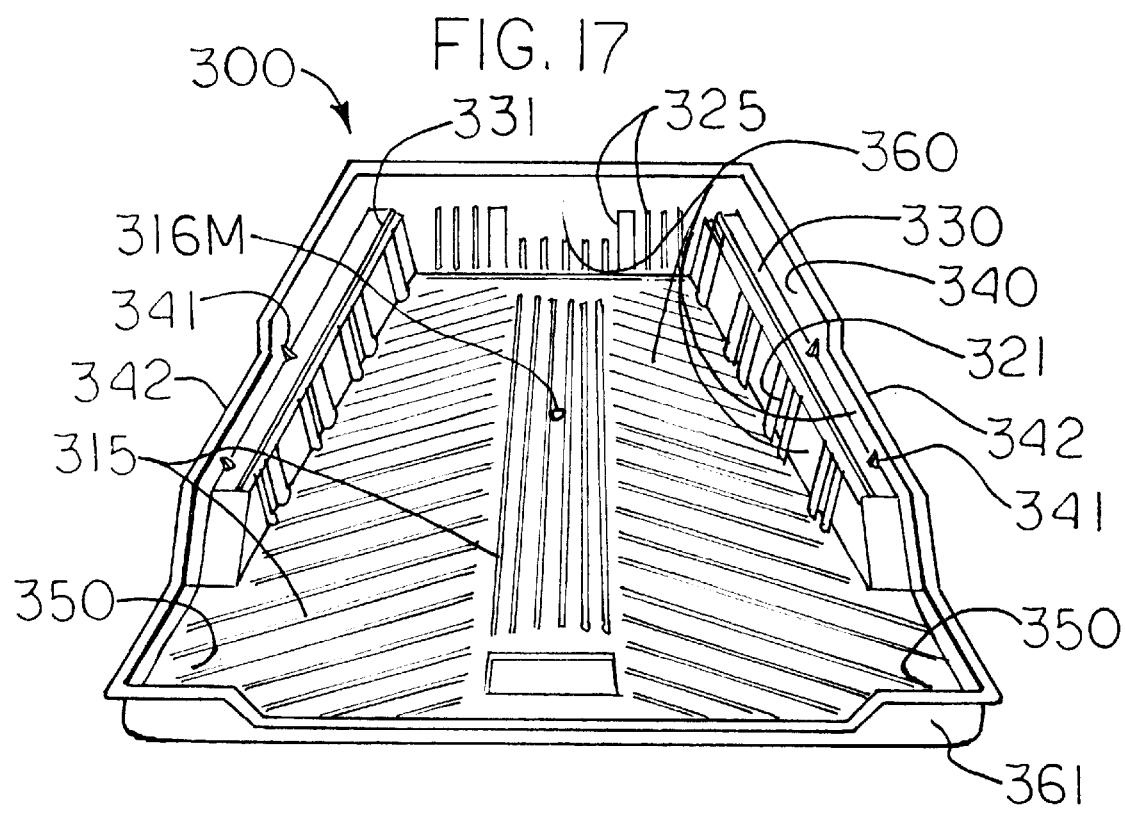
FIG. 17 is a rear perspective view of another embodiment of an over the wheel well tray of the invention, having lowered portions to upper side walls for even more ergonomically efficient loading and unloading.
Figure 18:
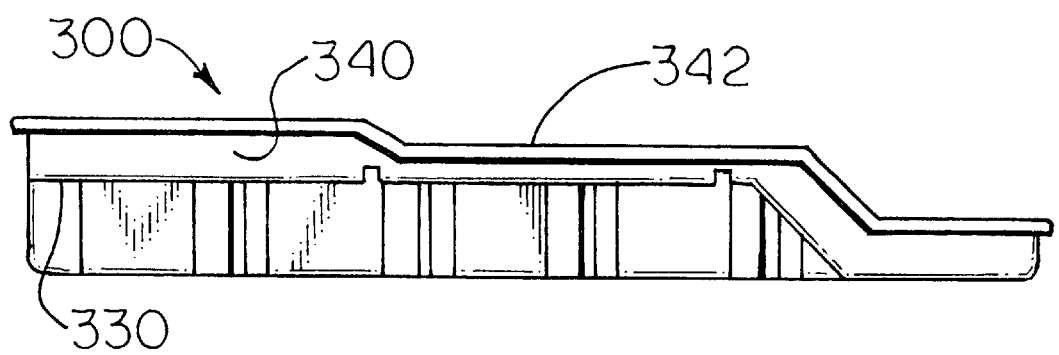
FIG. 18 is a left side view of the tray of FIG. 17.

With further reference to the drawings, completely assembled and installed systems 1000 are depicted in FIGS. 1, 8 & 11. In addition, depicted are assembled systems 1000, not necessarily installed, in FIGS. 10, 12 & 19; the uninstalled subassemblies of stationary and base mounting frames 100, 200 in FIGS. 7A & 7B; separate stationary frames 100 or portions thereof in FIGS. 2, 3, 4A & 4B, and an installed hook-mounting stationary frame with views of parts of and for the same in FIGS. 20A, 20B, 20C & 20D; separate tray-mounting, movable rolling frames 200 or portions thereof in FIGS. 5 & 6; and separate trays 300 in FIGS. 9 & 13–18. In typical practice of the invention, the frame 100 is mounted to a suitable base surface such as those mentioned above, a preferred example being the bed of a pickup truck, by suitable fastening devices, for example, suitable sheet metal screws and/or bolts and nuts, or, as an alternative example, by a hooking type system; the movable, rolling frame 200 can be put in place on the stationary base frame 100 much like a cabinet drawer; and the tray 300 is placed on the rolling frame 200 by suitable fastening devices, for example, bolts and nuts, although it otherwise could be secured to the frame 200 by gluing or other suitable means. See, e.g., FIGS. 8, 10 & 20.

With particular reference to FIGS. 2–4, 7, 8 & 20, the stationary frame 100 can have a pair of parallel, longitudinally directed side rails 110 with inwardly facing roller tracks 111. Roller stopping block(s) 112 may be provided at the superficial or "tailgate" (rear) end of the rail 110 to help keep the rolling frame 200 from becoming separated from the base frame 100 during extension. The block 112 can be mounted in any suitable fashion, say, by providing it with female threads and fastening it with a male bolt through a prepositioned hole in the vertical face of the rail roller track 111. Mounted generally above the roller track 111 are sets of spinnable bearings (upper, tray-supporting rollers) 113, say, of steel. Preferably, the rail 110 is in the form of an inverted F-channel which has above the lower roller track 111 a vertically extending face 114 and upper roller track 115 defined by central horizontally extending portion 116 and a lower horizontally extending portion, to and in which face 114 the rollers 113 are mounted and spin. A suitable number of the upper rollers 113 are provided, beneficially, for example, four, in sets of two each mounted near the rear end of the rail 110 inner face 114, say, at about a 16-inch or so distance apart in prepositioned mounting holes such as with one upper roller 113 mounted an inch or so from the rear end of the rail 110, and the other roller 113 mounted seventeen inches or so from the rear end of the rail 110. The roller tracks 111 can accommodate drawer frame rollers 250, say, of steel. A suitable number of cross-members 120, say, three to five, are secured to the rails 110 to hold them in place, generally with more cross-members 120 in the longer systems, and the cross-members 120 can take various forms and have various dimensions. For example, cross-member 121 can be L-shaped and be for mounting at the front or "deep" or cab end of the frame 100; cross-member can be 122 next, followed by cross-members 123 & 124, the latter to be mounted at the front or "superficial" or tailgate end of the frame 100; the cross-members 122, 123, 124 may have an inverted U-shaped cross-section, for example, or, say, have a rectangular cross-section, and so forth. Mounting holes 125 may be provided inside the rails 110 in the cross-members 120. Resilient, shock-absorbing pads 126 may be provided on rearward facing surfaces of the L-shaped cross-member 121 so as to cushion the impact of the frames 100, 200 when the system 1000 is fully closed, and/or resilient, shock-absorbing pads 127 may be provided on the frontward facing surface of the stop block 112 so as to cushion the impact of the frames 100, 200 when the system 1000 is fully opened. The pads 126, 127 can be made of a rubber, rubbery synthetic plastic, cork, or the like. The rails 110 can be mounted to the cross-members 120 by any suitable means such as screwing, riveting, gluing, and so forth; an excellent way to to mount the rails 110 to the cross-members 120, however, is through metal to metal welds 128. As a further alternative, the rail and cross-member assembly 110/120 may be made monolithically. Generally, as explained more fully elsewhere herein, the stationary frame is mounted by screws, nuts and bolts, or the like. However, along this line, an alternative method of attachment which employs hooks 129 attached to the underside of the frame 110 can be provided. The forwardly directed hooks 129 fit into the receptacle 19 and engage the stationary frame engaging member 29; a thrusting hook and handle combination 129H, which may have a cam-endowed member for engagement with the frame engaging member 29, can be activated to force the assembly forward, and secure it. See, FIGS. 20A–D. Base mounting tabs 130 external to the rail 110 may be provided such as by extensions of cross-members 120, or, as an alternative, by attaching mounting tabs separate from a cross-member. The tabs 130 may have outside mounting holes 131 formed therein in addition to or in lieu of any inside mounting holes 125. Preferably, however, the system 1000 is fastened to the surface 9 with screw or nut and bolt type fasteners through at least the inside mounting holes 125. An advantageous feature of the frame 110 is that it can be "ramped" so that, in general, the deep (front or "cab") end of the frame is mounted closer to the suitable mounting surface (pickup truck, van, trailer bed, etc.) than is the superficial (rear or "tailgate") end. This ramping can be accomplished by having external tabs 130 offset more and more from the rails 110 or, more preferably, having successively thicker cross-members 120 supporting the rails 110, for example, providing the cross-member 121 with a ¼-inch thickness, the cross-member 122 with a ⅜-inch thickness, the cross-member 123 with a ½-inch thickness, and the cross-member 124 with a ⅝-inch thickness. Compare, FIG. 4A. The ramp gradient can keep the drawer frame from hitting certain tailgates of certain model pickup trucks, for example, and more, it can bias a drawer frame and tray assembly 200, 300 toward the closed position and assist in closing. Furthermore, it may help keep spills in the tray 300 until a suitable grade is found to drain them as noted further in further following description. Inside roller bearing mounting holes 150 may be provided in a cross-member 120, for example, in one nearest the superficial (rear or "tailgate") end such as the cross-member 124, so that a pair inside roller bearing wheels 151, of steel, may be mounted thereby to guide the drawer frame 200, which itself may swing slightly from side to side, and reduce friction when opening and closing the drawer frame assembly 200, 300 rollingly attached to the stationary frame 100. In general, the rollers 113, 151 & 250 are provided with suitable tolerances so as to permit proper rolling action during extension and retraction of the frames 100, 200. Locking pin-engaging ramps 163 may be provided on the inner face 114 of the rail between the wheels 113 and front end of the rail 110, in opposing sets, front set 163F near the front (deep or "cab") end of the rail with the widest part of the wedge closest to the front of the rail 110, and rear set 163R in front of the set of wheels 113 with the widest part of the wedge closest to the rear of the rail 110. Middle set 163M may also be provided; however, when it is, care should be taken to keep the locking system disengaged when it passes by the ramps 163M if it is desired to not stop there. In general, front and rear locking pin-engaging ramps 163F, 163R alone are often provided. These ramps 163, which may be of any suitable material and may have a hardened face, can be employed in lieu of holes, the holes being a viable alternative, for engaging spring-loaded, sliding pin of locking system 260/263 and may be attached, say, by riveting, welding, or in any other suitable manner. Riveting of the ramps 163 is beneficially provided as the rivets are easily installed at the factory, and, should a ramp 163 become disengaged, the home-repairman may fix this with a nut and bolt. Alternatively, the ramps 163 may be provided by being formed monolithically with the rail 110.

With particular reference to FIGS. 5–8, the movable drawer frame 200 includes inverted J-shaped side rails 210 and cross-members 220, which are suitably attached, say, welded together. Alternatively, the frame 200 including the rails 210 and the cross-members 220, may be constructed by screwing its component parts together, riveting, gluing, and so forth, or may provided by being formed monolithically. A suitable number, say, from three to seven, cross-members 220 are employed, generally with more cross-members 220 in the longer systems; for example, there may be provided five cross-members 220: one a rear-facing cross-member 221, which may generally have a rotated-L (or gamma) cross section, and four remaining cross-members 222, which may generally have an inverted-U shape. With respect to the inverted J-shaped side rails 210, each rail 210 can have depending, wheel-mounting portion 211; depending, rail-aligning portion 212; and upper, tray-mounting and supporting portion 213, which is generally non-depending but co-planar with the tray 300, and typically against and under which portion 213 the upper set of rollers 113 mounted on the inner face 114 of the side rail 110 of the stationary frame 110 rollingly engage so as to directly support the portion 213 as well as the tray 300. Upper wing-supporting members 214 may be provided as desired or necessary, for example, to support wings of an over the wheel well tray, and lower wing-supporting trays 215 may be provided as; desired or necessary, for example, to support rear longitudinal extensions of the over the wheel well tray 300. See, FIGS. 11 & 12. The members 214 and trays 215 may be made of any suitable material, say, aluminum, and be attached in any suitable manner to the rail 210, say, by welding. Other means of attachment such as screwing or riveting may be employed. As an alternative, the supporting members 214 and trays 215 may be made monolithic with the rail 220 and/or movable frame 200 as a whole. Tray mounting holes 223 may be provided in the cross-members 220. As an alternative, cross-member penetrating screws or other fasteners such as staples, rivets, pins, and so forth, or glue, may be employed without there being prepositioned tray mounting holes 223. Tray access draining holes 224 may also be provided, for example, in the cross-member 220 closest to the superficial (rear or "tailgate") end. To the side rails 210 are attached a number of the roller bearing wheels 250, again say, of steel, mounted for tracking in the roller tracks 111 of the base frame rails 110. For example, four rollers 250 may be so mounted, one set of two by each of the two front corners of the side rails 210. The inverted J-shaped side rails 210 engage appropriately with the base frame side rails 110, and act otherwise much like a cabinet drawer set up.

However, when the frames 100, 200 are closed in the system, the weight in the tray 300 is supported in an upward fashion by the rollers 113 while the rollers 250 support the tray upwardly by having their weight borne in the lower horizontally extending portion 117 defining the channel 111; when the system is extended, the weight in the tray is supported in an upward fashion by the rollers 113 while pressure from the upper portion of the rollers 250 in the central horizontally extending portion 116 defining the channel 111 is applied to support the extended load, in a quasi-lever action. Stops 252 are typically provided in the moving frame side rails 210, say, one per rail, to engage the stop blocks 112 and keep the movable frame 200 from being pulled away from the stationary frame 100 when the frame 200 is extended. The stops 252 can be of any suitable material, say, steel, and mounted in any suitable manner, say, by screwing into the rails 210; alternatively, the stops 252 may have a resilient, shock-absorbing coating in lieu of or addition to the resilient, shock-absorbing pads 127, and be employed for the same purpose. Drawer locking subsystem 260 can keep the drawer frame and tray assembly 100, 200, 300 in locked position, and can be unlocked for extension of the tray for loading or unloading. Rearward facing knob 261 attached to communicating link 262 such as a cable, chain, rod or the like may be pulled to pull and activate to open the locking arrangement 263, which can be of the spring-loaded, sliding pin or peg type, the same engaging and sliding up the front or rear ramp 163F/163R to drop off after it passes the widest part of the wedge 163 to secure it in locked position. Pulling the handle 261 releases the pin by pulling it in so that it may pass the wedge 163 for free movement until it again rides up a wedge 163 and locks. As an alternative to the wedge 163, the simple expedient of a hole in the rail 110, say, in a suitable position of the face 114, may be employed to cooperate with the pin or peg of the locking arrangement 263 for locking. Preferably, the link 262 is a cable which has split 264 so that a plurality, say, a pair, of locking arrangements 263 which are provided are simultaneously activated. The cable 262 may be threaded through holes 265 in the cross-members 220. Locking device access holes 266, say, two 266F in the front or more preferably only one such hole 266M in a middle location, may be provided for installation, inspection, repair and/or replacement purposes, if desired or necessary. The locking subsystem is simple and effective in all types of typically encountered environments to include under dirty as well as not conditions. When the drawer is closed, the peg again with its spring or other means biased adaptation enters the corresponding peg-mating space beyond the wedge 163 or a hole to lock the drawer in its closed position so that it cannot be extended accidentally. Other locking features may be employed to include use of switch activated solenoid locks and so forth and the like. Pull out handle 270 is generally provided, and the handle 270 may be separate, of the loop variety, and placed alongside the knob 261 for good control of movement during extension and retraction, particularly when heavily loaded. As an alternative, a locking arrangement activating knob/pull out handle combination may be provided such as by paddle handle 261/270 (FIG. 19).

The tray 300 has bottom 310 and may have side walls 320. The tray bottom may be provided with installation holes 313 for registry with the drawer frame holes 223; drain holes 314 for registry with the holes 224, and locking mechanism access holes 316, say, as two front holes 316F or more preferably only one hole 316M in the middle of the tray, for registry with the access holes 266, 266F, 266M if present. The tray holes 314, 316 may be provided with a hole closure disc (not illustrated) for closing the same when it is desirable to close off access to the holes; this can provide advantages in control of spills during use: it thus becomes possible that, only when the system 1000 is suitably positioned, say on a ramp, the tray is drained of spilled liquids or even particulate solids, say, through the drain hole(s) 314. The tray bottom 310, particularly if made of a polyolefin or the like structurally, may be provided with corrugation or ribs 315, especially as depicted in FIGS. 1, 9 & 11–19. The ribs 315 may be molded to be approximately the same thickness as other parts of the tray 300; the patterns on the bottom 310 are configured to reduce warpage and increase strength of the tray, increase ease of movement of cargo by hand anywhere on the tray bottom 310, and provide for a sink for moisture or other liquid(s). Thus, the rib pattern may include major areas having longitudinal (front to rear) and latitudinal (side to side) components or vectors, and so, diagonally oriented rib pattern major areas, herringbone or serpentine rib pattern major areas, and so forth are possible. A preferred pattern, in general, has two diagonally oriented rib pattern major areas, each a mirror image of the other, separated by a central major area of longitudinal ribs. See, FIGS. 1, 9 & 11–18. Carpeted or looped material 317 may be provided in the tray 300. See, FIG. 19. A corresponding set of hook-endowed straps or other members known in the art (not illustrated) may be provided as a cargo containment or separator device. Suitably opposing vertical indentations or braced slots 321 beneficially can be provided in the drawer tray walls so as to brace the side walls 320 hold removable vertical tray divider 322, which may be made of dimension lumber or more preferably of a suitable plastic: resin, for example, an extruded polyvinyl chloride, the divider 322 extends across the tray from one indentation or braced slot 321 to another to divide the box into smaller load-carrying compartments. Over the wheel well pull out drawer box tray 300 (FIGS. 9 & 11–18) is especially adapted for a pickup truck or other vehicle having wheel wells; in addition to the foregoing components, it may have additional side bracing ribs 325 such as by molding akin to the ribs 315. Extending outwardly from a side wall 310 is wing member 330, which may further have horizontal platform-guiding ridge 331, which, preferably in conjunction with the side bracing ribs 325 that are at the same height as the wing 330 from the bottom 310, can support horizontal divider and cargo support platform 332, which, for example, may be a 4-foot by 8-foot sheet of plywood. Wing side walls 340 are preferably present, which may be braced with wing ribs 341, and the wing side walls 340 may optionally have ergonomically placed wall recesses 342, i.e., lowered wing wall sections, for greater ease in loading and unloading cargo. The wings of the over the wheel well tray 300 as well as a more wide rear bottom tray extension 350 can be supported by the support members 214 and trays 215 of the movable frame 200. As previously indicated, the tray 300 may be vacuum molded from one sheet. Beneficially, the sheet has one side 360, i.e., the "up" side, being provided with or modified by a material with a high coefficient of friction so that the cargo may be less inclined to slide about if not otherwise restrained, and the other, opposing side 361, i.e., the "down" side, having a more usual low coefficient of friction for the material forming the substance of the tray. Normally, systems 1000 with trays 300 such as depicted in FIG. 1 have the higher walled ends mounted on the movable frame 200 toward the front or cab end of the vehicle. However, it is possible to reverse the orientation of such a tray 300 in a 180-degree manner so that what normally would be the rear end of the tray now becomes the front end; this has the advantage of frequently permitting the system, when closed, to slide under a standard, side to side, pickup truck tool box.

In general, the height of the system 1000 or its components is that which is suitable for the purpose intended. Overall heights in inches accordingly may vary, say, from two, three and a half, six, seven, eight, ten, or twelve, more or less.

Accordingly, a schedule of component parts for assembly of an exemplary system 1000 (FIG. 1) may be listed as follows:

| Part Description | Quantity |
| --- | --- |
| Stationary Mounting Frame 100: | |
| 1-inch double track extruded aluminum side rail (inverted F-channel) 110 | Two |
| 1.25-inch × 1.25-inch × ⅛ inch × ¼ inch L-angle style mounting cross member (⅛ inch lower leg for full size models, which also generally have additional cross-member(s)) 121 | One |
| 1.25- × ⅜ inch × 3/16 inch cross member 122 | One |
| 1.25- × ½ inch × 3/16 inch cross member 123 | One |
| 1.25- × ⅝ inch × 3/16 inch cross member 124 | One |
| 0.5- × 0.75- × 1.5-inch aluminum roller stop block 112 | Two |
| Wheels (rollers) 113 | Four |
| Wheels (rollers) 151 | Two |
| 0.5- × 0.75- × 3-inch locking pin ramp wedges 163 | Four. |
| Movable box/tray unit mounting frame 200: | |
| 2.563- × 2- × 0.25-inch aluminum side member (inverted J-channel) 210 | Two |
| 2.75- × 3.25- × 1.25- × 0.125-inch cross-member (inverted J-shape) 221 | One |
| 1.5- × 3.25- × 1.5- × 0.125-inch cross-member (inverted U-shape) 222 | Four |
| Wheels (rollers) 250 | Four |
| Steel stops 252 | Two |
| Loop type pull out handle 270 | One. |
| Locking subsystem 260: | |
| Release knob 261 | One |
| Cable (Y-split) with housing 262 | One |
| Pin lock mechanism 263 | Two. |
| Box/tray subsystem 300: | |
| Tray 300 | One |
| Vertical divider(s) 322 | 0–4 |
| Horizontal divider/shelf 332 | 0–1. |

In addition, an assortment of fasteners is generally provided with or after assembly of the above components, particularly the assembly of the frames 100, 200, so as to mount the stationary frame 100 to a suitable surface. For example, the suitable surface may be the bed of a pickup truck, and fifteen round head ¼-×¾-inch bolts, each with a ¼-×1-inch washer, a ¼-inch lock washer, and a ¼-inch nut, can be supplied and employed to fasten the tray 300 to the frame 200, with the bolt heads and washers positioned above the tray 300 and the lock washers and nuts below; and four or more ¼-inch self-tapping screws for mounting at least two through each cross-member 121 & 124 at least inside the rails 110 to the bed 9 of the truck, and four or more ¼-×1 ½-inch bolts with lock washers and nuts for mounting at least two through each cross-member 122 & 123 at least inside the rails 110 to the bed 9 of the truck. Longer bolts, for example, ¼-×2-inch hex head bolts, may be provided and employed if a bed liner is present. Shims may be employed in some models between the frame 100 and the bed 9 as necessary.

Listed are some invention systems available for pickups:

APPLICATIONS GUIDE

| MAKE | MODEL | YEAR | STYLE | BED LENGTH | | CARGO DRAWER MODEL # | DIVIDER KIT PART # |
|---|---|---|---|---|---|---|---|
| DOMESTIC | | | | | | | |
| Chevy/C-K/ GMC | Full-Size 1500,2500,3500 | All Years | ➢ Regular & Extended Cab ➢ Fleetside & Step Side | Short Long | 6.5' 8' | 104877 104895 | 090001 090001 |
| | Compact S10/Sonoma | All Years | ➢ Regular & Extended Cab Fleetside & Step Side | Short Long | 6' 7' | 103971 103982 | 090003 090003 |
| Dodge | Full-Size RAM | All Years | ➢ Regular & Extended Cab | Short Long | 6.5' 8' | 104877 104895 | 090001 090001 |
| | Mid-Size Dakota | All Years | ➢ Regular & Extended Cab | Short Long | 6' 8' | 104377 104395 | 090002 090002 |
| Ford | Full-Size F-150, F-250, F-350 | All Years | ➢ Regular & Extended Cab ➢ Fleetside & Flareside | Short Long | 6.5' 8' | 104877 104895 | 090001 090001 |
| | Compact Ranger | All Years | ➢ Regular & Extended Cab ➢ Fleetside & Flareside | Short Long | 6' 7' | 103971 103982 | 090003 090003 |
| IMPORT | | | | | | | |
| Isuzu/Mazda /Mitsubishi/ Nissan | Compact | All Years | ➢ Regular & Extended Cab | Short Long | 6' 7' | 103971 103982 | 090003 090003 |
| Toyota | Full Size Tundra | All Years | ➢ Regular & Extended Cab | Short | 6.5' | 104877 | 090001 |
| | Mid Size T-100 | All Years | ➢ Regular & Extended Cab | Short Long | 6.5' 8' | 104877 104895 | 090002 090002 |
| | Compact SR5/Tacoma | All Years | ➢ Regular & Extended Cab | Short | 6' | 103971 | 090003 |

| | Full-Size Long | Full-Size Short | Mid Size Long | Mid Size Short | Compact Long | Compact Short |
|---|---|---|---|---|---|---|
| Model # | 104895 | 104877 | 104395 | 104377 | 103982 | 103971 |
| Approx. Dimensions | 48" x 95" | 48" x 77" | 43" x 95" | 43" x 77" | 39" x 82" | 39" x 71" |
| Approx. Weight | 115 lbs | 94 lbs | 112 lbs | 88 lbs | 91 lbs | 80 lbs |

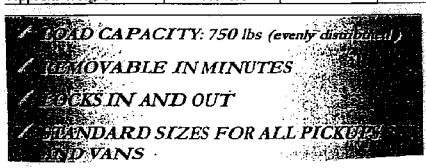

- LOAD CAPACITY: 750 lbs (evenly distributed)
- REMOVABLE IN MINUTES
- LOCKS IN AND OUT
- STANDARD SIZES FOR ALL PICKUPS AND VANS

CARGOPRO
Cargo Management Systems
Cargopro, Inc.
Kimball, MI   St. Thomas, ON
Tel: (800) 236-5959
Fax: (877) 885-8827
www.cargopro-inc.com

CONCLUSION

The present invention is thus provided. Various features, parts, subcombinations and combinations of the invention may be practiced with or without reference to various other features, parts, subcombinations and combinations of the invention, and numerous adaptations and modifications can be effected within its spirit, the literal claim scope of which is particularly pointed out as follows:

I claim:

1. A pull out drawer system for vehicles and trailers comprising:
   a stationary mounting frame having a set of parallel rails having a first set of rollers mounted thereon, said set of rails adapted for receiving a second set of rollers; and
   a subcombination having a movable frame having the second set of rollers mounted thereon, and a load-bearing surface mounted to the movable frame,
   the movable frame and load-bearing surface subcombination mounted to the stationary mounting frame with rolling contact both between the first set of rollers and the movable frame and between the set of parallel rails and the second set of rollers.

2. In combination, the system of claim 1 and a vehicle or trailer, said system mounted to a suitable surface of said vehicle or trailer.

3. A pull out drawer system having a first, pull out end, and a second end opposing said first end, comprising a stationary frame; a movable frame in cooperation therewith; and a load bearing surface mounted to the movable frame—wherein the stationary frame is ramped so that the assembly is higher on the pull out end than on the opposing end.

4. The system of claim 3, wherein the load bearing surface is an over the wheel well pull out tray for a pickup truck or other vehicle having wheel wells, comprising a generally planarly laid out bottom member having a plurality of major areas, at least one of which has a series of ribs with a longitudinal and a latitudinal component; at least one upraised side wall extending from the bottom member; and, extending outwardly from said at least one side wall, a wing member, from which a wing side wall having a height extends upwardly; wherein a tray sidewall contiguous with said at least one upraised side wall extends upwardly from said bottom member to a height less than the height of said wing side wall.

5. In combination, the system of claim 3 and a vehicle or trailer, said system mounted to a suitable surface of said vehicle or trailer.

6. A pull out drawer system assembly comprising a stationary frame; a movable frame in cooperation with the stationary frame; and, mounted to the movable frame, a load bearing surface comprising a generally planarly laid out bottom member having a first end, a second end opposing the first end, and two sides which oppose each other in a latitudinal direction and span in a longitudinal direction between the first and second ends; at least three major areas, each of which span in the longitudinal direction between the first and second ends: one a central area which has a series of ribs that run in the longitudinal direction; and two being lateral areas, each of which run alongside the entire central area, and in each of which a series of ribs with a longitudinal and a latitudinal component is present alongside the entire central area.

7. The system assembly of claim 6, wherein the load bearing surface is a tray including said generally planarly laid out bottom member; two opposing side walls, each connected to the bottom member; and a front wall connected to said side walls and said bottom member.

8. A pull out drawer system assembly comprising a stationary frame; a movable frame in cooperation with the stationary frame; and, mounted to the movable frame, an over the wheel well pull out tray for a pickup truck or other vehicle having wheel wells, which tray includes:
   a generally planarly laid out bottom member;
   at least one upraised side wall extending from the bottom member;
   a wing member extending outwardly from said at least one side wall, from which wing member a wing side wall having a height extends upwardly; and
   a tray sidewall contiguous with said at least one upraised side wall, which tray sidewall extends upwardly from said bottom member to a height less than the height of said wing side wall.

9. In combination, the system of claim 8 and a vehicle or trailer, said system mounted to a suitable surface of said vehicle or trailer.

10. A pull out drawer system for vehicles and trailers comprising:
    a stationary mounting frame having a set of parallel rails having a first set of rollers mounted thereon, said set of rails adapted for receiving a second set of rollers: and
    a subcombination having a movable frame having the second set of rollers mounted thereon; and a load-bearing surface which is a tray which includes a generally planarly laid out bottom member, two opposing side walls each side wall upraised and connected to the bottom member, and a front wall connected to side walls and said bottom member, said tray mounted to the movable frame,
    the movable frame and tray subcombination mounted to the stationary mounting frame with rolling contact both between the first set of rollers and the movable frame and between the set of parallel rails and the second get of rollers.

11. The system of claim 10, wherein the tray is a polyolefin.

12. The system of claim 10, wherein the set of parallel rails of the stationary frame are in the form of inverted F-channels, on which the first set of rollers are mounted and into which the second set of rollers can be received; the movable frame includes a set of side rails, each side rail in the form of an inverted J-channel, on which the second set of rollers is mounted; and the tray further includes a rear wall opposite the front wall and connected to said side walls and said bottom member.

13. The system of claim 10, wherein said bottom member of the tray has a plurality of major areas, at least one of which has a series of ribs with a longitudinal and a latitudinal component.

14. The system of claim 13, wherein the tray is a polyethylene.

15. The system of claim 10, wherein the stationary frame is ramped so as to be higher on a pull out rear end than on an opposing front end.

16. The system of claim 10, wherein at least one of the sides walls has a wing member extending outwardly therefrom, from which a wing side wall having a height extends upwardly; and a tray sidewall near a rear part of the tray, contiguous with said at least one of the side walls and extending upwardly from said bottom member to a height less than the height of said wing side wall.

17. A pull out drawer system for vehicles and trailers comprising:
    a stationary mounting frame having a set of parallel rails having a first set of rollers mounted thereon, said set of rails adapted for receiving a second set of rollers, and which frame is ramped so as to be higher on a pull out rear end than on an opposing front end; and a subcombination having a movable frame having the second set of rollers mounted thereon, and a load-bearing surface mounted to the movable frame, the movable frame and load-bearing surface subcombination mounted to the stationary mounting frame with rolling contact both between the first set of rollers and the movable frame and between the set of parallel rails and the second set of rollers.

18. The system of claim 17, further including a locking subsystem mounted on the movable frame, which includes a rear release handle, which is connected to a communicating link having a split, terminating ends of which activate spring-loaded, sliding pin type locking arrangements, which engage cooperating elements on the stationary frame.

19. A pull out system comprising a stationary rail having a first set of rollers mounted thereon, said rail adapted for receiving a second set of rollers; and a movable rail having the second set of rollers mounted thereon, wherein the movable rail is mounted to the rail with rolling contact both between the first set of rollers and the movable rail and between the stationary rail and the second set of rollers.

20. The system of claim 19, wherein the stationary rail is in the form of an inverted F-channel, and the movable rail is in the form of an inverted J-channel.

21. The system of claim 20, wherein the stationary and movable rails each include a pair of opposing, parallel rails, and the system further includes a set of inside roller bearing wheels mounted on a cross-member that spans the stationary frame rails.

22. The system of claim 19, wherein the stationary frame is ramped so that the system is higher on a first, pull out end, than on a second, opposing end.

23. The system of claim 20, wherein the stationary frame is ramped so that the system is higher on a first, pull out end, than on a second, opposing end.

24. The system of claim 21, wherein the stationary frame is ramped so that the system is higher on a first, pull out end, than on a second, opposing end.

25. A pull out drawer system for vehicles and trailers comprising:

a stationary mounting frame having a set of parallel rails in the form of inverted F-channels, on which a first set of rollers is mounted thereon, and into which rails a second set of rollers can be received; and a subcombination having a movable frame including a set of parallel side rails, each in the form of an inverted J-channel, on which the second set of rollers is mounted, and a load-bearing surface mounted to the movable frame, the movable frame and load-bearing surface subcombination mounted to the stationary mounting frame with rolling contact both between the first set of rollers and the movable frame and between the set of parallel rails and the second set of rollers.

26. The system of claim 25, wherein the stationary frame is ramped so that the system is higher on a first, pull out end, than on a second, opposing end.

27. The system of claim 26, further including a locking subsystem mounted on the movable frame, which includes a rear release handle, which is connected to a communicating link having a split, terminating ends of which activate spring-loaded, sliding pin type locking arrangements, which engage cooperating elements on the stationary frame.

28. The system of claim 27, wherein the stationary and movable rails each include a pair of opposing, parallel rails, and the system further includes a set of inside roller bearing wheels mounted on a cross-member that spans the stationary frame rails.

29. The system of claim 25, wherein the load bearing surface embraces a tray having a generally planarly laid out bottom member having at least three major areas, one a central area which has a series of ribs that run in a longitudinal direction; and two being lateral areas, each alongside the central area, and in each of which a series of ribs with a longitudinal and a latitudinal component is present; and the tray further including front, rear, and side walls connected to the bottom member, with the front and rear walls connected to the side walls, and opposing vertical indentations or braced slots provided in the side walls which can hold a removable vertical tray divider.

30. The system of claim 28, wherein the load bearing surface embraces a tray having a generally planarly laid out bottom member having at least three major areas, one a central area which has a series of ribs that run in a longitudinal direction; and two being lateral areas, each alongside the central area, and in each of which a series of ribs with a longitudinal and a latitudinal component is present; and the tray further including front, rear, and side walls connected to the bottom member, with the front and rear walls connected to the side walls, and opposing vertical indentations or braced slots provided in the side walls which can hold a removable vertical tray divider.

31. The system of claim 25, wherein the load bearing surface embraces a tray having a generally planarly laid out bottom member having at least three major areas, one a central area which has a series of ribs that run in a longitudinal direction; and two being lateral areas, each alongside the central area, and in each of which a series of ribs with a longitudinal and a latitudinal component is present; and the tray further includes front, rear, and side walls connected to the bottom member, with the front and rear walls connected to the side walls, wherein at least part of each of the side walls has a wing member extending outwardly therefrom, on each wing member being a horizontal platform-guiding ridge, and from which wing member a wing side wall having a height extends upwardly; a tray sidewall near a rear part of the tray, contiguous with said at least one of the side walls and extending upwardly from said bottom member to a height less than the height of said wing side wall; and opposing vertical indentations or braced slots provided in the side walls which can hold a removable vertical tray divider.

32. The system of claim 28, wherein the load bearing surface embraces a tray having a generally planarly laid out bottom member having at least three major areas, one a central area which has a series of ribs that run in a longitudinal direction; and two being lateral areas, each alongside the central area, and in each of which a series of ribs with a longitudinal and a latitudinal component is present; and the tray further includes front, rear, and side walls connected to the bottom member, with the front and rear walls connected to the side walls, wherein at least part of each of the side walls has a wing member extending outwardly therefrom, on each wing member being a horizontal platform-guiding ridge, and from which wing member a wing side wall having a height extends upwardly; a tray sidewall near a rear part of the tray, contiguous with said at least one of the side walls and extending upwardly from said bottom member to a height less than the height of said wing side wall; and opposing vertical indentations or braced slots provided in the side walls which can hold a removable vertical tray divider.

* * * * *

UNITED STATES PATENT AND TRADEMARK OFFICE
CERTIFICATE OF CORRECTION

PATENT NO.    : 6,328,364 B1
DATED         : December 11, 2001
INVENTOR(S)   : R. Alan Darbishire It is certified that error appears in the above-identified patent and that said Letters Patent is hereby corrected as shown below:

<u>Title page,</u>
Item [63], U.S. Application Data, delete "which is a continuation-in-part of" and insert therefor -- and --.

<u>Column 1,</u>
Line 9, delete "which is" and insert therefor -- and as --.

Signed and Sealed this

Second Day of July, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,328,364 B1
DATED         : December 11, 2001
INVENTOR(S)   : R. Alan Darbishire It is certified that error appears in the above-identified patent and that said Letters Patent is hereby corrected as shown below:

<u>Column 5,</u>
Lines 63-64, delete "cross-member can be 122" and insert therefor -- cross-member 122 can be --.
Line 65, delete "front" and insert therefor -- rear --.

<u>Column 6,</u>
Line 14, delete the second occurrence of "to" entirely.
Line 58, insert -- of -- immediately after "pair."

Signed and Sealed this

Eleventh Day of February, 2003

JAMES E. ROGAN
*Director of the United States Patent and Trademark Office*